United States Patent
Fellner (10) Patent No.: US 7,512,566 B1
(45) Date of Patent: Mar. 31, 2009

(54) SYSTEM AND METHOD FOR USING A STORED VALUE ACCOUNT HAVING SUBACCOUNT FEATURE

(75) Inventor: Debra C. Fellner, Wilmington, DE (US)

(73) Assignee: JPMorgan Chase Bank, N.A., New York, NY (US)

(*) Notice: Subject to any disclaimer, the term of this patent is extended or adjusted under 35 U.S.C. 154(b) by 305 days.

(21) Appl. No.: 10/011,971

(22) Filed: Dec. 11, 2001

(51) Int. Cl.
*G06Q 99/00* (2006.01)

(52) U.S. Cl. .................. 705/67; 705/64; 705/65; 705/75; 705/44

(58) Field of Classification Search .................. 705/26, 705/1, 14, 50–79, 40–44; 235/380
See application file for complete search history.

(56) References Cited

U.S. PATENT DOCUMENTS

| | | | |
|---|---|---|---|
| 3,634,669 A | 1/1972 | Wyckoff et al. | |
| 3,946,206 A | 3/1976 | Darjany | |
| 4,047,033 A | 9/1977 | Maimberg | |
| 4,465,206 A | 8/1984 | Sorel et al. | |
| 4,545,838 A | 10/1985 | Minkus | |
| 4,582,985 A | 4/1986 | Lofberg | |
| 4,614,861 A | 9/1986 | Pavlov et al. | |
| 4,634,845 A | 1/1987 | Riley | |
| 4,689,478 A | 8/1987 | Hale et al. | |
| 4,700,055 A | 10/1987 | Kashkashian, Jr. | |
| 4,746,787 A | 5/1988 | Okada | |
| 4,750,119 A | 6/1988 | Robertson | |
| 4,752,676 A | 6/1988 | Leonard et al. | |
| 4,754,418 A | 6/1988 | Hara | |
| 4,766,293 A | 8/1988 | Boston | |
| 4,766,539 A | 8/1988 | Fox | |
| 4,789,928 A | 12/1988 | Fujisaki | |
| 4,822,985 A | 4/1989 | Boggan et al. | |
| 4,831,242 A | 5/1989 | Englehardt | |
| 4,831,526 A | 5/1989 | Luchs | |
| 4,837,422 A | 6/1989 | Dethloff et al. | |
| 4,868,376 A | 9/1989 | Lessin et al. | |
| 4,870,259 A | 9/1989 | Boggan et al. | |
| 4,882,675 A | 11/1989 | Nichtberger et al. | |
| 4,897,533 A | 1/1990 | Lyszczarz | |

(Continued)

FOREIGN PATENT DOCUMENTS

CA 2293321 6/1998

(Continued)

OTHER PUBLICATIONS

CardEx Incentives, Apr. 6, 1999, www.cardexco.com.

(Continued)

*Primary Examiner*—Jalatee Worjloh
(74) *Attorney, Agent, or Firm*—Goodwin Procter LLP (57) ABSTRACT

A stored value account includes a general stored value field and may include at least one stored value sub-field. The sub-field may represent a category and include category-specific benefits stored in the sub-field by a issuer of the stored-value account. The category benefits may include discounts, loyalty points, merchant specific stored value or merchant promotions. The category represented may include a group of institutions, a location specific institution or a varied location institution. Both an institutional client and a consumer client may load value into the stored value account.

24 Claims, 5 Drawing Sheets

U.S. PATENT DOCUMENTS

| | | | |
|---|---|---|---|
| 4,906,826 A | 3/1990 | Spencer | |
| 4,908,521 A | 3/1990 | Boggan et al. | |
| 4,923,288 A | 5/1990 | Allen et al. | |
| 4,928,001 A | 5/1990 | Masada | |
| 4,941,090 A | 7/1990 | McCarthy | |
| 4,943,707 A | 7/1990 | Boggan | |
| 4,953,085 A | 8/1990 | Atkins | |
| 4,954,985 A | 9/1990 | Yamazaki | |
| 4,961,142 A | 10/1990 | Elliott et al. | |
| 4,968,873 A | 11/1990 | Dethloff et al. | |
| 4,975,840 A | 12/1990 | DeTore et al. | |
| 4,978,401 A | 12/1990 | Bonomi | |
| 4,992,940 A | 2/1991 | Dworkin | |
| 5,025,372 A | 6/1991 | Burton et al. | |
| 5,049,728 A | 9/1991 | Rovin | |
| 5,055,662 A | 10/1991 | Hasegawa | |
| 5,080,748 A | 1/1992 | Bonomi | |
| 5,095,194 A | 3/1992 | Barbanell | |
| 5,117,355 A | 5/1992 | McCarthy | |
| 5,175,416 A | 12/1992 | Mansvelt | |
| 5,180,901 A | 1/1993 | Hiramatsu | |
| 5,192,947 A | 3/1993 | Neustein | |
| 5,202,286 A | 4/1993 | Nakatani | |
| 5,202,826 A | 4/1993 | McCarthy | |
| 5,206,803 A | 4/1993 | Vitagliano | |
| 5,218,631 A | 6/1993 | Katz | |
| 5,247,190 A | 9/1993 | Friend et al. | |
| 5,276,311 A | 1/1994 | Hennige | |
| 5,287,268 A | 2/1994 | McCarthy | |
| 5,287,269 A | 2/1994 | Dorrough et al. | |
| 5,297,026 A | 3/1994 | Hoffman | |
| 5,311,594 A | 5/1994 | Penzias | |
| 5,326,959 A | 7/1994 | Perazza | |
| 5,326,960 A | 7/1994 | Tannenbaum | |
| 5,328,809 A | 7/1994 | Holmes et al. | |
| 5,339,239 A | 8/1994 | Manabe et al. | |
| 5,349,633 A | 9/1994 | Katz | |
| 5,350,906 A | 9/1994 | Brody et al. | |
| 5,359,183 A | 10/1994 | Skodlar | |
| 5,365,575 A | 11/1994 | Katz | |
| 5,383,113 A | 1/1995 | Knight | |
| 5,397,881 A | 3/1995 | Mannik | |
| 5,399,502 A | 3/1995 | Friend et al. | |
| 5,401,827 A | 3/1995 | Holmes et al. | |
| RE34,915 E | 4/1995 | Nichtberger et al. | |
| 5,424,524 A | 6/1995 | Ruppert | |
| 5,450,477 A | 9/1995 | Amarant | |
| 5,453,601 A | 9/1995 | Rosen | |
| 5,455,407 A | 10/1995 | Rosen | |
| 5,459,306 A | 10/1995 | Stein et al. | |
| 5,465,206 A | 11/1995 | Hilt | |
| 5,466,919 A | 11/1995 | Hovakimian | |
| 5,471,669 A | 11/1995 | Lidman | |
| 5,477,038 A | 12/1995 | Levine | |
| 5,477,040 A | 12/1995 | Lalonde | |
| 5,479,494 A | 12/1995 | Clitherow | |
| 5,482,139 A | 1/1996 | Rivalto | |
| 5,483,444 A | 1/1996 | Malark | |
| 5,483,445 A | 1/1996 | Pickering | |
| 5,500,514 A | 3/1996 | Veeneman | |
| 5,511,114 A | 4/1996 | Stimson et al. | |
| 5,512,654 A | 4/1996 | Holmes et al. | |
| 5,513,102 A | 4/1996 | Auriemma | |
| 5,521,363 A | 5/1996 | Tannenbaum | |
| 5,530,232 A * | 6/1996 | Taylor | 235/380 |
| 5,530,235 A | 6/1996 | Stefik et al. | |
| 5,537,314 A | 7/1996 | Kanter | |
| 5,544,086 A | 8/1996 | Davis et al. | |
| 5,544,246 A | 8/1996 | Mandelbaum et al. | |
| 5,553,120 A | 9/1996 | Katz | |
| 5,577,109 A | 11/1996 | Stimson et al. | |
| 5,578,808 A | 11/1996 | Taylor | |
| 5,581,064 A | 12/1996 | Riley et al. | |
| 5,585,787 A | 12/1996 | Wallerstein | |
| 5,590,038 A | 12/1996 | Pitroda | |
| 5,592,560 A | 1/1997 | Deaton et al. | |
| 5,604,542 A | 2/1997 | Dedrick | |
| 5,608,785 A | 3/1997 | Kasday | |
| 5,612,868 A | 3/1997 | Off | |
| 5,621,787 A | 4/1997 | McKoy et al. | |
| 5,621,812 A | 4/1997 | Deaton et al. | |
| 5,637,845 A | 6/1997 | Kolls | |
| 5,638,457 A | 6/1997 | Deaton et al. | |
| 5,642,279 A | 6/1997 | Stone | |
| 5,642,485 A | 6/1997 | Deaton et al. | |
| 5,644,723 A | 7/1997 | Deaton et al. | |
| 5,644,727 A | 7/1997 | Atkins | |
| 5,649,114 A | 7/1997 | Deaton et al. | |
| 5,649,117 A | 7/1997 | Landry | |
| 5,649,118 A | 7/1997 | Carlisle et al. | |
| 5,653,914 A | 8/1997 | Holmes et al. | |
| 5,664,110 A | 9/1997 | Green et al. | |
| 5,664,157 A | 9/1997 | Takahira et al. | |
| 5,665,953 A | 9/1997 | Mazzamuto | |
| 5,672,678 A | 9/1997 | Holmes et al. | |
| 5,675,607 A | 10/1997 | Alesio et al. | |
| 5,675,662 A | 10/1997 | Deaton et al. | |
| 5,677,955 A | 10/1997 | Doggett et al. | |
| 5,684,291 A | 11/1997 | Taskett | |
| 5,687,322 A | 11/1997 | Deaton et al. | |
| 5,689,100 A | 11/1997 | Carrithers et al. | |
| 5,689,650 A | 11/1997 | McClelland et al. | |
| 5,692,132 A | 11/1997 | Hogan | |
| 5,696,907 A | 12/1997 | Tom | |
| 5,699,528 A | 12/1997 | Hogan | |
| 5,703,344 A | 12/1997 | Bezy | |
| 5,704,046 A * | 12/1997 | Hogan | 705/39 |
| 5,705,798 A | 1/1998 | Tarbox | |
| 5,708,422 A | 1/1998 | Blonder et al. | |
| 5,710,458 A | 1/1998 | Iwasaki | |
| 5,710,886 A | 1/1998 | Christensen | |
| 5,710,887 A | 1/1998 | Chelliah | |
| 5,710,889 A | 1/1998 | Clark et al. | |
| 5,715,399 A | 2/1998 | Bezos | |
| 5,721,768 A | 2/1998 | Stimson | |
| 5,721,781 A | 2/1998 | Deo et al. | |
| 5,727,153 A | 3/1998 | Powell | |
| 5,728,998 A | 3/1998 | Novis et al. | |
| 5,729,693 A | 3/1998 | Holda-Fleck | |
| 5,734,154 A | 3/1998 | Jachimowicz et al. | |
| 5,734,838 A | 3/1998 | Robinson | |
| 5,736,728 A | 4/1998 | Matsubara | |
| 5,737,421 A | 4/1998 | Audebert | |
| 5,740,549 A | 4/1998 | Reilly et al. | |
| 5,742,775 A | 4/1998 | King | |
| 5,745,049 A | 4/1998 | Akiyama et al. | |
| 5,745,706 A | 4/1998 | Wolfberg et al. | |
| 5,749,075 A | 5/1998 | Toader et al. | |
| 5,760,381 A | 6/1998 | Stich et al. | |
| 5,765,141 A | 6/1998 | Spector | |
| 5,770,843 A | 6/1998 | Rose et al. | |
| 5,770,849 A | 6/1998 | Novis et al. | |
| 5,774,870 A | 6/1998 | Storey | |
| 5,777,305 A | 7/1998 | Smith | |
| 5,777,306 A | 7/1998 | Masuda | |
| 5,777,903 A | 7/1998 | Piosenka et al. | |
| 5,778,067 A | 7/1998 | Jones et al. | |
| 5,787,156 A | 7/1998 | Katz | |
| 5,787,404 A | 7/1998 | Fernandez-Holman | |
| 5,789,733 A | 8/1998 | Jachimowicz et al. | |
| 5,794,207 A | 8/1998 | Walker | |
| 5,799,087 A | 8/1998 | Rosen | |
| 5,802,176 A | 9/1998 | Audebert | |
| 5,805,719 A | 9/1998 | Pare et al. | |

| | | | | | | |
|---|---|---|---|---|---|---|
| 5,806,042 A | 9/1998 | Kelly et al. | | 6,006,988 A | 12/1999 | Behrmann et al. |
| 5,806,044 A | 9/1998 | Powell | | 6,009,415 A | 12/1999 | Shurling et al. |
| 5,806,045 A | 9/1998 | Biorge | | 6,014,636 A | 1/2000 | Reeder |
| 5,807,627 A | 9/1998 | Friend et al. | | 6,014,638 A | 1/2000 | Burge et al. |
| 5,809,478 A | 9/1998 | Greco | | 6,014,645 A | 1/2000 | Cunningham |
| 5,815,657 A | 9/1998 | Williams et al. | | 6,014,749 A | 1/2000 | Gloor et al. |
| 5,815,658 A | 9/1998 | Kuriyama | | 6,016,482 A | 1/2000 | Molinari et al. |
| 5,819,234 A | 10/1998 | Slavin et al. | | 6,016,954 A | 1/2000 | Abe |
| 5,819,237 A | 10/1998 | Garman | | 6,019,284 A | 2/2000 | Freeman et al. |
| 5,832,457 A | 11/1998 | O'Brien | | 6,026,370 A | 2/2000 | Jermyn |
| 5,835,061 A | 11/1998 | Stewart | | 6,029,139 A | 2/2000 | Cunningham et al. |
| 5,835,576 A | 11/1998 | Katz | | 6,029,890 A | 2/2000 | Austin |
| 5,839,113 A | 11/1998 | Federau et al. | | 6,032,136 A | 2/2000 | Brake, Jr. et al. |
| 5,845,259 A | 12/1998 | West et al. | | 6,036,099 A | 3/2000 | Leighton |
| 5,845,260 A | 12/1998 | Nakano et al. | | 6,038,292 A | 3/2000 | Thomas |
| 5,852,811 A | 12/1998 | Atkins | | 6,038,552 A | 3/2000 | Fleischl |
| 5,852,812 A | 12/1998 | Reeder | | 6,041,315 A | 3/2000 | Pollin |
| 5,857,079 A | 1/1999 | Claus | | 6,044,360 A | 3/2000 | Picciallo |
| 5,857,175 A | 1/1999 | Day | | 6,045,042 A | 4/2000 | Ohno |
| 5,857,709 A | 1/1999 | Chock | | 6,047,067 A | 4/2000 | Rosen |
| 5,859,419 A | 1/1999 | Wynn | | 6,049,463 A | 4/2000 | O'Malley et al. |
| 5,864,609 A | 1/1999 | Cross et al. | | 6,049,773 A | 4/2000 | McCormack et al. |
| 5,864,828 A | 1/1999 | Atkins | | 6,049,782 A | 4/2000 | Gottesman et al. |
| 5,864,830 A | 1/1999 | Armetta | | 6,058,378 A | 5/2000 | Clark et al. |
| RE36,116 E | 2/1999 | McCarthy | | 6,064,985 A | 5/2000 | Anderson |
| 5,870,718 A | 2/1999 | Spector | | 6,065,675 A | 5/2000 | Teicher |
| 5,870,721 A | 2/1999 | Norris | | 6,068,183 A | 5/2000 | Freeman et al. |
| 5,875,437 A | 2/1999 | Atkins | | 6,070,147 A | 5/2000 | Harms et al. |
| 5,883,377 A | 3/1999 | Chapin, Jr. | | 6,070,153 A | 5/2000 | Simpson |
| 5,883,810 A | 3/1999 | Franklin et al. | | 6,076,068 A | 6/2000 | DeLapa et al. |
| 5,884,271 A | 3/1999 | Pitroda | | 6,076,072 A | 6/2000 | Libman |
| 5,884,278 A | 3/1999 | Powell | | 6,078,888 A | 6/2000 | Johnson, Jr. |
| 5,884,285 A | 3/1999 | Atkins | | 6,078,891 A * | 6/2000 | Riordan et al. ................ 705/10 |
| 5,887,065 A | 3/1999 | Audebert | | 6,091,817 A | 7/2000 | Bertina et al. |
| 5,890,138 A | 3/1999 | Godin et al. | | 6,092,056 A | 7/2000 | Tull, Jr. et al. |
| 5,890,140 A | 3/1999 | Clark et al. | | 6,095,412 A | 8/2000 | Bertina et al. |
| H1794 H | 4/1999 | Claus | | 6,095,416 A | 8/2000 | Grant et al. |
| 5,897,620 A | 4/1999 | Walker et al. | | 6,098,053 A | 8/2000 | Slater |
| 5,905,246 A * | 5/1999 | Fajkowski .................. 235/375 | | 6,105,011 A | 8/2000 | Morrison, Jr. |
| 5,911,135 A | 6/1999 | Atkins | | 6,105,865 A | 8/2000 | Hardesty |
| 5,911,136 A | 6/1999 | Atkins | | 6,115,458 A | 9/2000 | Taskett |
| 5,914,472 A | 6/1999 | Foladare et al. | | 6,119,932 A | 9/2000 | Maloney et al. |
| 5,920,629 A | 7/1999 | Rosen | | 6,122,623 A | 9/2000 | Garman |
| 5,920,844 A | 7/1999 | Hotta et al. | | 6,128,598 A | 10/2000 | Walker et al. |
| 5,920,847 A | 7/1999 | Kolling et al. | | 6,128,599 A | 10/2000 | Walker et al. |
| 5,923,734 A | 7/1999 | Taskett | | 6,129,274 A * | 10/2000 | Suzuki ....................... 235/381 |
| 5,926,800 A | 7/1999 | Baronowski | | 6,134,536 A | 10/2000 | Shepherd |
| 5,930,217 A | 7/1999 | Kayanuma | | 6,138,917 A | 10/2000 | Chapin, Jr. |
| 5,931,764 A | 8/1999 | Freeman et al. | | 6,145,741 A | 11/2000 | Wisdom et al. |
| 5,933,817 A | 8/1999 | Hucal | | 6,148,297 A | 11/2000 | Swor et al. |
| 5,937,068 A | 8/1999 | Audebert | | 6,161,096 A | 12/2000 | Bell |
| 5,940,811 A | 8/1999 | Norris | | 6,163,770 A | 12/2000 | Gamble et al. |
| 5,952,641 A | 9/1999 | Korshun | | 6,164,533 A | 12/2000 | Barton |
| 5,953,423 A | 9/1999 | Rosen | | 6,167,385 A | 12/2000 | Hartley-Urquhart |
| 5,953,710 A * | 9/1999 | Fleming ...................... 705/38 | | 6,169,975 B1 | 1/2001 | White et al. |
| 5,955,961 A | 9/1999 | Wallerstein | | 6,173,267 B1 | 1/2001 | Cairns |
| 5,963,648 A | 10/1999 | Rosen | | 6,173,269 B1 * | 1/2001 | Solokl et al. .................. 705/35 |
| 5,970,479 A | 10/1999 | Shepherd | | 6,182,048 B1 | 1/2001 | Osborn et al. |
| 5,970,480 A | 10/1999 | Kalina | | 6,182,894 B1 | 2/2001 | Hackett et al. |
| 5,974,399 A | 10/1999 | Giuliani et al. | | 6,186,793 B1 | 2/2001 | Brubaker |
| RE36,365 E | 11/1999 | Levine et al. | | 6,189,787 B1 | 2/2001 | Dorf |
| 5,984,180 A | 11/1999 | Albrecht | | 6,195,644 B1 | 2/2001 | Bowie |
| 5,984,191 A | 11/1999 | Chapin, Jr. | | 6,202,053 B1 | 3/2001 | Christiansen et al. |
| 5,987,434 A | 11/1999 | Libman | | RE37,122 E | 4/2001 | Levine et al. |
| 5,988,509 A | 11/1999 | Taskett | | 6,227,447 B1 | 5/2001 | Campisano |
| 5,991,413 A | 11/1999 | Arditti et al. | | 6,243,688 B1 | 6/2001 | Kalina |
| 5,991,748 A | 11/1999 | Taskett | | 6,263,316 B1 | 7/2001 | Khan et al. |
| 5,991,750 A | 11/1999 | Watson | | 6,265,977 B1 | 7/2001 | Vega et al. |
| 6,000,608 A | 12/1999 | Dorf | | 6,278,981 B1 | 8/2001 | Dembo et al. |
| 6,000,832 A | 12/1999 | Franklin et al. | | 6,295,522 B1 | 9/2001 | Boesch |
| 6,002,383 A | 12/1999 | Shimada | | 6,298,336 B1 | 10/2001 | Davis et al. |
| 6,003,762 A | 12/1999 | Hayashida | | 6,308,268 B1 | 10/2001 | Audebert |
| 6,004,681 A | 12/1999 | Epstein et al. | | 6,336,099 B1 | 1/2002 | Barnett et al. |

| | | |
|---|---|---|
| 6,341,724 B2 | 1/2002 | Campisano |
| 6,343,743 B1 | 2/2002 | Lamla |
| 6,345,261 B1 | 2/2002 | Feidelson |
| 6,345,766 B1 | 2/2002 | Taskett et al. |
| 6,349,291 B1 | 2/2002 | Varma |
| 6,360,954 B1 | 3/2002 | Barnardo |
| 6,366,220 B1 | 4/2002 | Elliott |
| 6,373,969 B1 | 4/2002 | Adler |
| 6,385,591 B1 | 5/2002 | Mankoff |
| 6,386,444 B1 | 5/2002 | Sullivan |
| 6,397,202 B1 | 5/2002 | Higgins et al. |
| 6,402,039 B1 | 6/2002 | Freeman et al. |
| 6,405,182 B1 | 6/2002 | Cuervo |
| 6,422,459 B1 | 7/2002 | Kawan |
| 6,422,462 B1 | 7/2002 | Cohen |
| 6,429,927 B1 | 8/2002 | Borza |
| 6,434,259 B1 | 8/2002 | Hamid et al. |
| 6,446,210 B1 | 9/2002 | Borza |
| 6,450,407 B1 | 9/2002 | Freeman et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,484,144 B2 | 11/2002 | Martin et al. |
| 6,484,148 B1 | 11/2002 | Boyd |
| 6,498,861 B1 | 12/2002 | Hamid et al. |
| 6,505,168 B1 | 1/2003 | Rothman et al. |
| 6,560,578 B2 | 5/2003 | Eldering |
| 6,574,603 B1 | 6/2003 | Dickson et al. |
| 6,581,839 B1 | 6/2003 | Lasch et al. |
| 6,601,761 B1 | 8/2003 | Katis |
| 6,609,111 B1 | 8/2003 | Bell |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,675,127 B2 | 1/2004 | LaBlanc et al. |
| 6,687,222 B1 | 2/2004 | Albert et al. |
| 6,693,544 B1 | 2/2004 | Hebbecker |
| 6,745,938 B2 | 6/2004 | Sullivan |
| 6,802,008 B1 | 10/2004 | Ikefuji et al. |
| 6,805,287 B2 | 10/2004 | Bishop |
| 6,865,547 B1 | 3/2005 | Brake, Jr. et al. |
| 6,868,426 B1 | 3/2005 | Mankoff |
| 7,104,443 B1 | 9/2006 | Paul et al. |
| 2001/0011243 A1 | 8/2001 | Dembo et al. |
| 2001/0027441 A1 | 10/2001 | Wankmueller |
| 2001/0034682 A1 | 10/2001 | Knight et al. |
| 2001/0044293 A1 | 11/2001 | Morgan |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0019803 A1 | 2/2002 | Muller |
| 2002/0026418 A1 | 2/2002 | Koppel et al. |
| 2002/0046255 A1 | 4/2002 | Moore et al. |
| 2002/0062235 A1 | 5/2002 | Wahlbin et al. |
| 2002/0077978 A1 | 6/2002 | O'Leary et al. |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0104878 A1 | 8/2002 | Seifert et al. |
| 2002/0116271 A1 | 8/2002 | Mankoff |
| 2002/0120627 A1 | 8/2002 | Mankoff |
| 2002/0143703 A1 | 10/2002 | Razvan et al. |
| 2002/0147662 A1 | 10/2002 | Anderson |
| 2002/0165820 A1 | 11/2002 | Anvekar et al. |
| 2002/0174016 A1 | 11/2002 | Cuervo |
| 2003/0004828 A1 | 1/2003 | Epstein |
| 2003/0023549 A1 | 1/2003 | Armes et al. |
| 2003/0028481 A1* | 2/2003 | Flitcroft ............... 705/39 |
| 2003/0028518 A1 | 2/2003 | Mankoff |
| 2003/0033246 A1 | 2/2003 | Slater |
| 2003/0046249 A1 | 3/2003 | Wu |
| 2003/0053609 A1 | 3/2003 | Risafi et al. |
| 2003/0101119 A1 | 5/2003 | Parsons et al. |
| 2003/0105672 A1 | 6/2003 | Epstein et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0154125 A1 | 8/2003 | Mittal et al. |
| 2003/0163403 A1 | 8/2003 | Chen et al. |
| 2003/0163416 A1 | 8/2003 | Kitajima |
| 2003/0172040 A1 | 9/2003 | Kemper et al. |
| 2003/0195808 A1 | 10/2003 | Brown et al. |
| 2003/0200143 A9 | 10/2003 | Walker et al. |
| 2003/0200180 A1 | 10/2003 | Phelan et al. |
| 2003/0216965 A1 | 11/2003 | Libman |
| 2004/0024672 A1 | 2/2004 | Brake, Jr. et al. |
| 2004/0030626 A1 | 2/2004 | Libman |
| 2004/0039588 A1 | 2/2004 | Libman |
| 2004/0093303 A1 | 5/2004 | Picciallo |
| 2004/0098351 A1 | 5/2004 | Duke |
| 2004/0243498 A1 | 12/2004 | Duke |
| 2005/0027649 A1 | 2/2005 | Cech |
| 2005/0071230 A1 | 3/2005 | Mankoff |
| 2005/0075932 A1 | 4/2005 | Mankoff |
| 2005/0091138 A1 | 4/2005 | Awatsu |
| 2005/0171898 A1 | 8/2005 | Bishop et al. |

FOREIGN PATENT DOCUMENTS

| | | |
|---|---|---|
| EP | 959440 | 11/1999 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 9858345 | 12/1998 |
| WO | WO 99/05633 | 2/1999 |
| WO | WO 01/69347 | 9/2001 |
| WO | WO 2005/043277 | 5/2005 |

OTHER PUBLICATIONS

"Associates First Capital Corporation", Hoover's Inc., The Industry Standard: The Newsmagazine of the Internet Economy, thestandard.net/companies/cpmpany-display, Apr. 6, 1999.

Jeffrey M. Lacker, "Stored Value Cards: Costly Private Substitutions for Government Currency", Economic Quarterly, 1996.

"The Evolution of a New Consumerism", Chain Store Age, vol. 73, pp. 8-9, Jun. 1997.

Lisa Fickenscher, "Amex prepaid offering is latest card for firms regarding employees", American Banker, vol. 161, No. 151, p. 11, Aug. 8, 1996.

"Welcome to Swiftgift", Swiftgift, www.swiftgiftcard.com, Dec. 8, 1998.

Lucy Lzarony, "Stuck for a gift? Give a prepaid credit card", www.bankrate.com, Dec. 21, 1998.

Antoinette Coulton, "Incentives field moving to card-based series 14", American Banker, Mar. 26, 1998.

Credit Card News, "A store card issuer looks for lift from electronic gift certificates", Feb. 4, 1995.

Business Travel News, "Maritz gets mastercard's stamp of approval", Aug. 19, 1996.

Debit Card News, vol. 2, Issue 2, "Boatman's floats stored value into the employee incentive waters", Jul. 16, 1996.

Mickey Meece, "Boatman's prepaid cards for worker-incentive firm", American Banker, Jul. 2, 1996.

Card News, vol. 6, No. 25, "D.C. Area Safeway stores look for increase in sales volume and revenue with cards", Dec. 1991.

Spurgin, "Sopininmon! or What's happening in the retail credit card environment", Credit World Journal, Apr. 1997.

AT&T Marketing, "Universal card free lifetime membership extended 3 months", www.att.com/press/0297/970217.csa.html, Dec. 4, 1990.

Introducing SpendingMoney(TM), Armetta: Marketing & Design Product Concept Report, Oct. 9, 1996.
First USA Platinum Connect, First USA Bank, First USA Promotional Mailing, Oct. 1997.
Introducing the First USA Platinum Connect Card, First USA Promotional Mailing, Dec. 1997.
Here's the calling convenience you asked for: 1-800-call-AT&T . . . For All Calls, Appendix A: For Card Carriers.
Beth Piskora, Debit Cards Seen Poised for New Markets, American Banker, pp. 16, Mar. 7, 1995.
Nick Rosen, Cash Just Isn't Flexible Enough: Shops of the Future Will Only Take Cards, Daily Express: Technology Section, Feb. 10, 1995.
Phil Britt, Competing in Auto Lending, America's Community Banker, vol. 5, No. 11, pp. 33-37, Nov. 1, 1996.
Miriam Krenin Souccar, Smart Cards: 1st Union Smart Card Pilot Enlists a Second Army Base, American Banker.
First Union Issues Smart Cards to Fort Benning Recruits, CardFax.
Emerson Brown and Jim Baum, Purchasing Card Magic: Eli Lilly Finds Accounts Payable Flying High With Plastic, Corporate Cashflow.
International Search Report for Application No. PCT/US01/03587 filed on Feb. 9, 2000 and dated Apr. 27, 2001.
International Preliminary Examination Report for Application No. PCT/USO1/03587 filed on Feb. 9, 2000 and dated Jul. 18, 2002.
SmartAxis, Supported Currencies and Schemes, printed Feb. 23, 2001 from website www.smartaxis.co.uk/cash/, 9 pages.
Brehl, Banks issue cash-card pledge, The Toronto Star, Thursday, Oct. 9, 1997, printed Feb. 23, 2001, from website insight.mcmaster.ca/org/efc/pages/media/toronto.star.09oct97b, 1 page.
News Clippings, Electronic purse card to be launched tomorrow, New Straits Times, Sep. 18, 1999, printed Feb. 23, 2001, from website www.meps.com, 3 pages.
Cordis, [ACE IST-1999-11531 PACE, Purse application for cross border use into euro, printed Feb. 23, 2001, fromw website www.cordis.lu, 3 pages.
Scia, Electronic purse, About smart cards, printed Feb. 23, 2001, from website www.scia.org, 1 page.
Hansell, Visa to unveil electronic purse cards, New York Times, printed Feb. 23, 2001, from website is.gseis.ucla.edu, 2 pages.
Sanchez-Klein, Electronic purse alliance planned, Computerworld, printed Feb. 23, 2001, form website 198.112.59.30/home/news.nsf, 2 pages.
Schlumberger Press Release, Smart card for loyalty and e-purse applications eclipses capability of conventional mag-stripe cards, printed Feb. 23, 2001 from website www.1.slb.com, 3 pages.
Stuber, The electronic purse: An overview of recent developments and issues, Jan. 1996, The Bank of Canada, printed Feb. 23, 2001, 2 pages.
The electronic purse reaches the car park, printed Feb. 23, 2001, from website docs.vircomnet.com, 2 pages.
SK100 Balance Reader, printed Feb. 23, 2001 from website perso.wanadoo.fr, 1 page.
ECARD, Frequently asked questions, printed Feb. 23, 2001 from website www.ecard.com, 7 pages.
Visa first to launch electronic purse load via gsm mobile phone, Johannesburg, Apr. 7, 1999, printed Feb. 23, 2001 form website www.cellular.co.za, 4 pages.
Business Times, Electronic purse can free you from atm drag, printed Feb. 23, 2001, from website www.btimes.co.za, 1 page.
Machlis, Computerworld, Have it the smart way: Burger King program drives smart-card use, printed Feb. 23, 2001, from website 198.112.59.30/home/print.nsf, 1 page.
Machlis et al., Will smart cards replace atms?, Computerworld, printed Feb. 23, 2001, from website.cgi.cnn.com, 3 pages.
Press Release '99—Jun. 28, Proton world and europay to co-operate in creation of new ceps-compliant e-purse application, New Agreement offers the freedom to combine proton technology with europay's clip brand, printed Feb. 23, 2001, from website www.europay.com, 2 pages.
ECL, Understanding the benefits, Smartcity offers a number of important benefits to both the card issuers and their customers, printed Feb. 27, 2001, form website www.icl.com, 2 pages.
Cards International, Jan. 30, 1996, "First data markets stored-value cards," p. 5.
Business Wire, Jan. 15, 1996, "CES/NaBANCO introduces stored value card technology; Blockbuster video is first merchant partner," 2 pages.
Melinda Norris, First data unit develops blockbuster cash card, Omaha World Herald, Jan. 19, 1996, Sunrise Edition, p. 16.
Valerie Block, "Blockbuster running test of stored value card," The American Banker, Sep. 1, 1995, 2 pages.
Welcome to Card Express, The CardEx Incentive Card, as disclosed in the CardEx web site archived by web.archive.org on Feb. 7, 1998 [http://web.archive.org/web/*/http://www.cardex.com], retrieve Oct. 18, 2003, 8 pages.
Welcome to Card Express, CardEx web site archived by web.archive.org on Oct. 31, 1996 [http://web.archive.org/web/*/http://www.cardex.com], retrieve Oct. 18, 2003, 7 pages.
Swift Gift 'Wows' Internet Shoppers, Wed., Dec. 2, 1998, PR Newswire, 2 pages (Author Unknown).
Incentive firms debit cards a rewarding experience (Off-line debit card issuers converge efforts with companies looking for effective incentives to boost employee productivity and to motivate individuals to buy their products), Debit Card News, vol. 3, No. 11, Nov. 28, 1997, (Author unknown), 3 pages.
Christine Dugas, Payroll may ask: Paper or plastic?, USA Today, Tuesday, Aug. 14, 2001, Section 3B, 1 page.
News Release, New 1-800-CALL-AT&T campaign one number for all calls, Monday Feb. 17, 1997, 2 pages.
CardEx Incentives, www.cardex.com, Apr. 6, 1999.
Bank, Cash, Check,Charge—What's Next?, Seattle Times, Mar. 6, 1995.
Vandenengel, Cards on the Internet: Advertising on a $3 Bill, Industry Intelligence, Feb. 1, 1995, pp. 46-48.
Kutler, Cash Card Creator Looking Beyond Beyond Mondex, Feb. 9, 1995.
Clark, Microsoft, Visa to Jointly Develop PC Electronic-Shopping Software, The Wall Street Journal, Nov. 9, 1994, WSJ B9.
Konrad, IBM Had a Bunch of Unusual Ideas in 2003, www.philly.com, printed Jan. 21, 2004, posted on Jan. 13, 2004, 2 pages.
Miller, Section E2.1: Kerberos Authentication and Authorization System, Project Athena, Cambridge, MA, Dec. 21, 1987, 39 pages.
Song, A Card That Asks For ID, Time Magazine, Apr. 12, 2004, 1 page.
Norris, First data unit develops blockbuster cash card, Omaha World Hearld Sunrise Edition, Business Section, Jan. 19, 1996, p. 16.
Payment data, www.paymentdata.com, Nov. 8, 2004.
Hotchkiss, ATM's at the head of their class, Bank Marketing, vol. 29, No. 3, Mar. 1997, pp. 26-32.
Bogle, Mutual Funds at the Millennium: Fund Directors and Fund Myths, The Vanguard Group to the '40 Act Institute of PLI (Practicing Law Institute), New York, NY, May 15, 2000, 15 pages.
5500—FDIC General Counsel's Opinion No. 8—Stored Value Cards, 61 Fed. Reg. 40490, http://www.fdic.gov/regulations/laws/rules/5500-500.html, Aug. 2, 1996.
Visa Cash—Where can I get it?, www.visa-asia.com/pd/cash/where.html, Feb. 23, 2001.
Visa International And SERMEPA Announce Plans For Cross Border Visa Cash Based On CEPS, www.visa.com/av/news/praaamisc111699.vhtml, Nov. 16, 1999.
Consortium created on manage common electronic purse specification, Cardtech Securtech, Chicago, www.visa.com/av/news/PRmisc051199.vhtml, May 11, 1999.
Visa releases visa cash electronic purse specifications based on CEPS, www.visa.com/av/news/PRaamisc042099.vhtml, San Francisco, Apr. 20, 1999.
Common electronic purse specifications, Business Requirements, Version 6.0, Dec. 1998.
Visa Cash, www.visa-asia.com/pd/cash/main.hml, Feb. 23, 2001.
Universal Card free lifetime membership extended 3 months, AT&T Marketing, www.att.com/press/0297/970217.csa.html, Dec. 4, 1990, 2 pages.
MailFrontier Survey Finds that Consumers Hold Financial Institutions Accountable for Online Identity Theft, www.mailfrontier.com, Palo Alto, CA, Nov. 2004.

CardFlash, Apr. 5, 2005.

E-Z Pass, Web page, http:\\www.ezpass.com-whatis.html, Nov. 12, 2001.

E-Z Pass, Web page, http:\\www.ezpass.com-frameMain.html, Nov. 12, 2001.

E-Z Pass, Web page, http://www.ezpass.com-Disc_portNewYork.html, Nov. 12, 2001.

E-Z Pass, Web page, http:\\www.ezpass.com-Disc_ny_annual.html, Nov. 12, 2001.

First USA—Activate Today and Get One Hour Free Calling Card Calls, Call 1-800-555-2535, First USA, 6 pages.

First USA—Call 1(800)335-2453 To Receive One Free Hour of Domestic Long Distance Calling (No Strings Attached), First USA, 6 pages.

Stoughton, 18 The Gift of Credit, www.washingtonpost.com/wp-srv/business, Dec. 14, 1998.

Key Bank Holiday Offer, http://www.key.com/swiftgift/home.html, printed Apr. 5, 1999.

Langheinrich, et al., Unintrusive Customization Techniques for Web Advertising, Computer Networks, vol. 31, 1999, pp. 1259-1272.

Mobasher, et al., 18 Creating Adaptive Web Sites Through Usage-Based Clustering of URLs, Knowledge and Data Engineering Exchange Workshop, Chicago, IL and Los Alamitos, CA, 1999, pp. 19-25.

Edwards, ATMs The Hot New Media Buy, ABA Banking Journal, Mar. 1999, pp. 58, 60.

Hoovers, General Mills, Inc. Corporate Profile relied upon to show the history of the company, http:/cobrands.hoovers.com/global/cobrands/proquest/history-xhtml?COID=10639, Jul. 12, 2005, 2 pages.

Morgan, et al., 18 Categorizing Risks for Risk Ranking, vol. 20, No. 1, Jun. 22, 2005, pp. 49-58.

Guidotti, Comparing Environmental risks: A Consultative Approach to Setting Priorities at the Community Level, Public Health Rev 1994, vol. 22, Jun. 16, 2005, pp. 321-337.

Neumann, 18 An Enhanced Neural Network Technique for Software Risk Analysis, IEEE Transactions on Software Engineering, vol. 28, No. 9, Sep. 1, 2002, pp. 904-912.

Lamond, 18 Credit Card Transactions Real World and Online, Paying By Credit Card-Real World and Online, http://www.virtualschool.edu/mon/ElectronicProperty/klamond/credit, printed Jul. 8, 2005, 17 pages.

Schwab, Now 7 Ways For A Better Total Return For your Money, Schwab 1, The Investor's Asset Management Account, Charles Schwab & Co., Inc., 16 pages.

A Store Card Issuer Looks for Lift from Electronic Gift Certificates, Credit Card News, Feb. 1, 1995, 2 pages.

Fickenscher, Amex Prepaid Offering is Latest Card for Firms Regarding Employees, American Banker, vol. 161, No. 151, Aug. 8, 1996, pp. 1-2.

Associates First Capital Corporation, Hoover's Inc., The Industry Standard: The Newsmagazine of the Internet Economy, thestandard.net/companies/company-display, Apr. 6, 1999.

Brehl, Banks issue cash-card pledge, The Toronto Star, Oct. 9, 1997, 1 page.

Blockbuster running test of a stored value card, The American Banker, Sep. 1, 1995.

Meece, Boatman's Prepaid Cards for Worker-Incentive Firm, American Banker, Jul. 2, 1996, p. 12.

Boatmen's Floats Stored Value into the Employee Incentive Waters, Debit Card News, vol. 2, Issue 2, Jul. 16, 1996, 3 pages.

CESNaBANCO introduces stored value card technology blockbuster video is first merchant partner.

Rosen, Cash Just Isn't Flexible Enough: Shops of the Future Will Only Take Cards, Daily Express, Technology Section, Feb. 10, 1995, 1 page.

Britt, Competing in Auto Lending, America's Community Banker, vol. 5, No. 11, Nov. 1, 1996, pp. 33-37.

D.C. Area Safeway Stores Look for Increase in Sales Volume and Revenue with Cards, Card News, vol. 6, No. 25, Dec. 30, 1991, pp. 7-9.

Piskora, Debit Cards Seen Poised for New Markets, American Banker, Credit/Debit/ATMs, Mar. 7, 1995, p. 16.

Business Times, Electronic Purse Can Free You from ATM Drag, Business Times, www.btimes.co.za, printed Feb. 23, 2001, 1 page.

Electronic Purse, SCIA (Smart Card Industry Association), About Smart Cards, www.scia.org, printed Feb. 23, 2001, 1 page.

Sanchez-Klein, Electronic purse alliance planned, Computerworld Online News, Jul. 29, 1998, printed Feb. 23, 2001, 2 pages.

Electronic purse card to be launched tomorrow, New Straits Times, News Clippings, Sep. 18, 1999, printed Feb. 23, 2001, 3 pages.

First Data markets stored-value cards, Cards International, Jan. 30, 1996, p. 5.

First USA Platinum Connect, First USA Bank, First USA Promotional Mailing, Oct. 1997, 6 pages.

First Union Issues Smart Cards to Fort Benning Recruits, CardFax, vol. 1999, No. 60, Mar. 26, 1999, 1 page.

Frequently asked questions, ECARD, www.eregard.com, printed Sep. 23, 2001, 7 pages.

Machlis, Have it the smart way: Burger King program drives smart-card use, Computerworld, printed Feb. 23, 2001, 1 page.

Here's the calling convenience you asked for: 1-800-call-ATT . . . For All Calls, AT&T, Appendix A: For Card Carriers, 1999, 7 pages.

Incentive Firms Find Debit Cards A Rewarding Experience (Off-line debit card issuers converge efforts with companies looking for effective incentives to boost employee productivity and to motivate individuals to buy their products), Debit Card News, Vol.

Coulton, Incentives Field Moving to Card-Based Series 14, American Banker, Mar. 26, 1998, 3 pages.

Introducing SpendingMoney(TM), Armetta: Marketing & Design Product Concept Report, Oct. 9, 1996, 15 pages.

Introducing the First USA Platinum Connect Card, First USA Promotional Mailing, Dec. 1997, 2 pages.

O'Conner, Maritz Gets MasterCard's Stamp of Approval, Business Travel News, Aug. 19, 1996, 2 pages.

More Retailers Turn to Co-Branding, Chain Store Age Executive with Shopping Center Age, Feb. 1, 1995, 3 pages.

New 1-800-CALL-ATT Campaign Promotes One Number for All Calls, AT&T Marketing, News Release, www.att.com/press/0297/970217.csa.htm, Feb. 17, 1997, 2 pages.

Dugas, Payroll May Ask: Paper or Plastic?, USA Today, 3B, Aug. 14, 2001, 1 page.

Proton world and Europay to co-operate in creation of new CEPS-compliant e-purse application, Press Release 1999, Waterloo, Belgium, Jun. 28, 1999, 2 pages.

Brown et al., Purchasing Card Magic: Eli Lilly Finds Accounts Payable Flying High With Plastic, Corporate Cashflow, vol. 15, No. 12, Nov. 1994, 2 pages.

Purse Application for Cross Border Use in Euro, Cordis, Pace 1st 1999-11531 Pace, www.cordis.lu, printed Feb. 23, 2001, 3 pages.

SK100 Smart Card Electronic Purse Balance Reader, SK100 Balance Reader, http://perso.wanadoo.fr, printed Feb. 23, 2001, 1 page.

Souccar, Smart Cards: 1st Union Smart Card Pilot Enlists a Second Army Base, American Banker, Digital Frontiers, vol. 164, No. 61, Mar. 31, 1999, 3 pages.

Smart card of loyalty and e-purse applications eclipses capability of conventional mag-stripe cards, Press Release, www.1.sib.com, Apr. 21, 1997, printed Feb. 23, 2001, 3 pages.

SmartAxis: Load Cash on to your E-Purse Card, Supported Currencies and Schemes, www.smartaxis.co.uk, printed Feb. 23, 2001, 9 pages.

Spurgin, Sopininmon! or What's Happening in the Retail Credit Card Environment, Credit World Journal, vol. 85, No. 4, Mar. 1, 1997, pp. 20-23.

Lacker, Stored Value Cards: Costly Private Substitutions for Government Currency, Economic Quarterly, 1996, Economic Quarterly, v82, n3, p. 1(25), ISSN: 1069-7225, 17 pages.

Lzarony, Stuck for a gift? Give a prepaid credit card, www.bankrate.com, Dec. 21, 1998, 1 page.

Key, Swift Gift 'Wows' Internet Shoppers, PR Newswire, www.key.com/swiftgift/home.html, Dec. 2, 1998, 1 page.

The Campus Card Conundrum, Card Technology, Journal ISSN: 1093-1279, p 25+, Feb. 1998, pp. 1-8.

The Electronic Purse Reaches the Car Park, http:\\docs.vircom.net/mobility/parking, printed Feb. 23, 2001, 2 pages.

The Evolution of a New Consumerism, Chain Store Age, vol. 73, Jun. 1997, pp. 8-9.

Stuber, The electronic purse: An overview of recent development and issues, Bank of Canada, Technical Report No. 74, www.bankofcanada.ca, Jan. 1996, printed Feb. 23, 2001, 2 pages.

Understanding the benefits: Smartcity offers a number of important benefits to both the card issuers and their customers, http://www.ici.com/smartcards/benefits.htm, printed Feb. 27, 2001, 2 pages.

Visa first to launch electronic purse load via GSM mobile phone, www.cellular.co.za, Johannesburg, ZA, printed Feb. 23, 2001, 4 pages.

Hansell, Visa to unveil electronic purse cards, New York Times, printed Feb. 23, 2001, 2 pages.

Welcome To Card Express CardEx, CardEx website archived by web.archive on Oct. 31, 1996, http://web.archive.org/web/*/http://www.cardex.com, retrieve Oct. 18, 2003, 7 pages.

Swiftgift, Welcome to Swiftgift, Swiftgift, www.swiftgiftcard.com, Dec. 8, 1998, 10 pages.

Machlis et al., Will smart cards replace ATMS?, Computerworld, printed Feb. 23, 2001, 3 pages.

Meridicaid vs. Debit Cards, JA7917.

Award Card Comparision, JA7922.

How is it Different?, JA8331.

Meridian Award Cards, JA8251.

Meridian—the leader in card marketing, JA8343.

Incenticard, JA8329.

Card Based Award Systems, JA8309.

* cited by examiner

SYSTEM AND METHOD FOR USING A STORED VALUE ACCOUNT HAVING SUBACCOUNT FEATURE

FIELD OF THE INVENTION

This invention relates generally to cashless transaction systems, and more particularly to stored value accounts and methods for using stored value accounts.

BACKGROUND OF THE INVENTION

Stored value cards are available to consumers to be used in place of cash. The stored value cards may hold a value that has been prepaid by the user or by others to the issuer. The cards may work within standard widely accepted or targeted networks, such as credit card networks, or may be used in a closed loop environment, for instance by using internal terminals at participating merchant establishments.

Stored value cards offer little flexibility or functionality to users or merchants who accept the cards. Businesses do not gain any benefit from accepting a stored value card and therefore have little incentive to accept such a card as payment.

Additionally, the user gets little benefit from using the stored value card. The major benefit to users is that they do not need to carry cash or own credit cards in order to make purchases.

Additionally, the user may load the card with value and spend money in a first merchant establishment. If the user does not accurately and diligently record the expenditures in the first merchant establishment, the user will not know how much value remains on the card the next time the user attempts to use the card in a second merchant establishment. Assuming that the user has a budget in mind for each merchant establishment, if the user overspends the budget in one merchant establishment, the user will not have enough value to purchase products that the user desires or needs before reaching the second merchant establishment from which the user would purchase additional products. Other problems also exist.

BRIEF SUMMARY OF THE INVENTION

It is therefore desirable to address the drawbacks in conventional stored value systems.

The invention overcoming these and other problems in the art relates, in one regard, to a stored value account. The invention relates to a stored value account including a general stored value field or purse and at least one stored value sub-field. The sub-field may represent a category and include category-specific benefits stored in the sub-field of the stored-value account. The account holder may be provided with an index to the account such as an account number or with a stored value instrument which stores either an account index, a value, or both.

According to another aspect of the invention, the category benefits may include discounts, loyalty points, merchant specific rebates or merchant promotions or other value or reward.

According to another aspect of the invention, the category represented by the sub-field may include a group of institutions, a location specific institution or a varied location institution.

According to yet another aspect of the invention, both a consumer client and an institutional client are capable of loading value into the stored value account through a load interface. Whereas the consumer client is typically able to load value into any account location, the institutional clients may be limited to loading value into a particular sub-field of the stored value account.

According to yet another aspect of the invention, a stored value system comprises a stored value account; an account access interface for permitting access by an institutional client and for permitting access by a consumer client; and an access mechanism for allowing access to the stored value account through the account access interface.

DETAILED DESCRIPTION OF THE INVENTION

Figure 1:
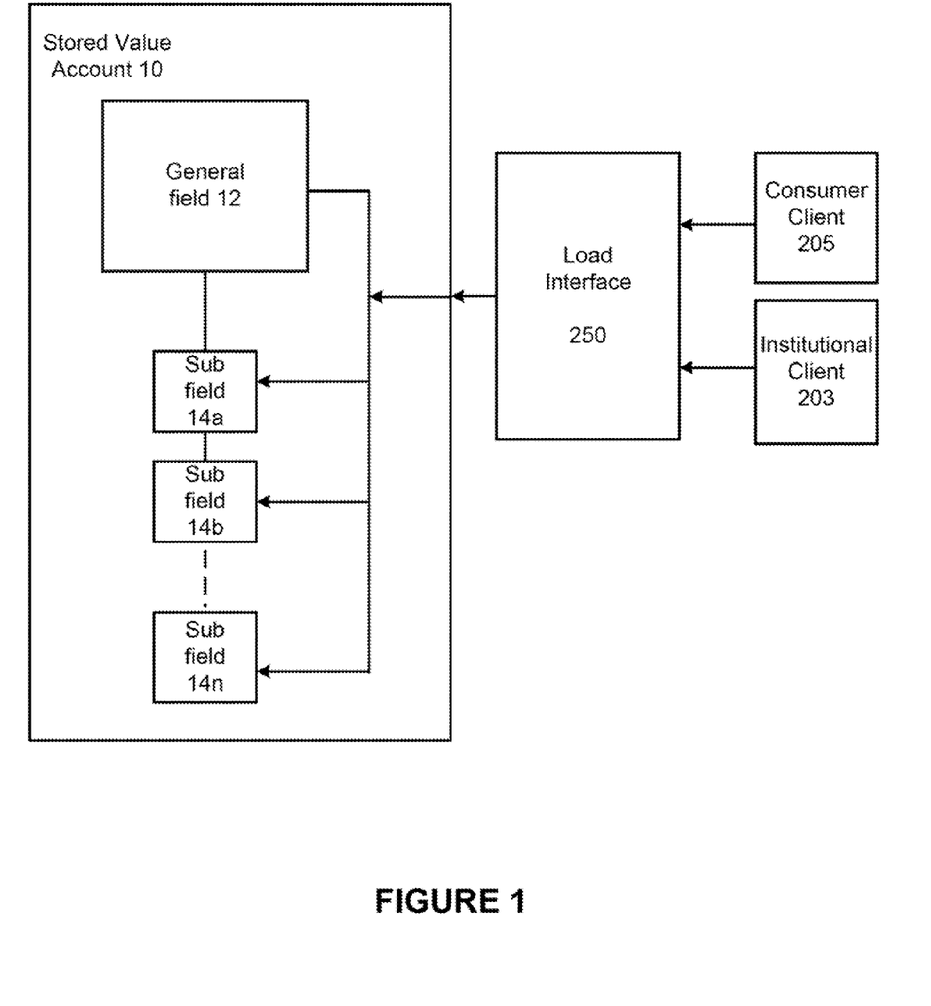
FIG. 1 is a block diagram illustrating one embodiment of a stored value account according to the present invention.

FIG. 1 is a block diagram illustrating one embodiment of a stored value account of the present invention. A stored value account 10 includes a general field purse area 12 and a plurality of sub fields 14a-14n. In the embodiment shown, sub-fields 14a-14n are located outside of general purse area 12. In an alternative embodiment, sub-fields 14a-14n may be a part of general purse area 12. For example, a certain fraction or percentage of the value stored in the general purse area 12 may be automatically placed in one or more of the sub-fields 14a-14n in a predetermined manner.

Figure 2:
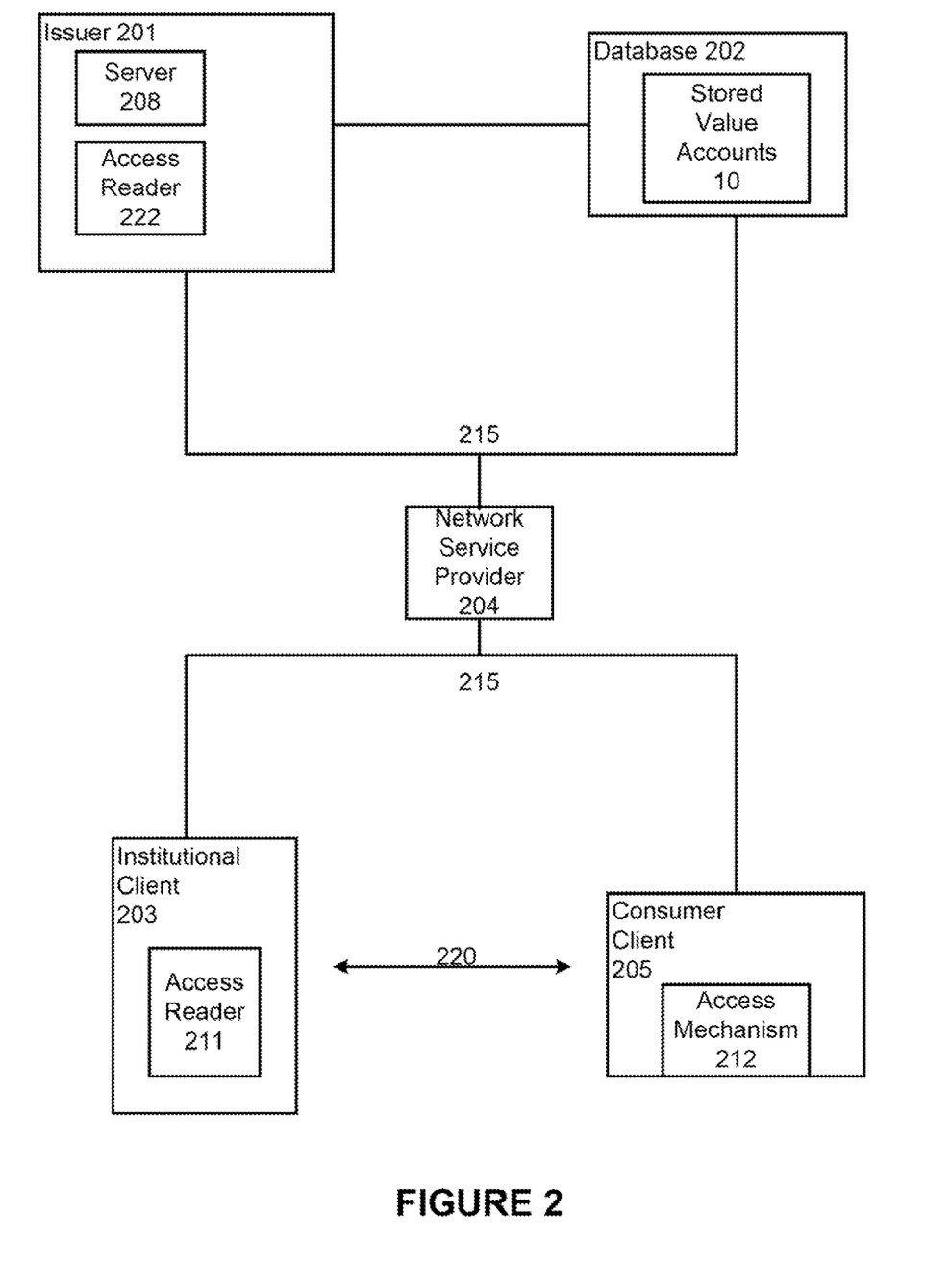
FIG. 2 is a block diagram illustrating one embodiment of a system implementing the stored value account of the present invention.

A consumer client 205 and an institutional client 203 are preferably linked to the stored value account 10 through an account access interface 250, which is explained in greater detail in FIG. 2. In general purse area 12, a value may be stored for use at any institutional client or other merchant or institution at which the stored value account 10 is accepted.

Sub-fields 14a-14n may hold benefits directed to one or more categories. In one embodiment, a category represented by one of the sub-fields 14a-14n may include an institutional client 203. Institutional clients 203 may include educational institutions, merchants, service providers, and others. The category of institution may include a group of institutions, location specific institution or a varied location institution. Categories representing a group of institutions may include airlines, fast food restaurants, grocery stores, sporting goods stores, universities, etc. The institutions may be represented by a category code. The category code may provide sufficient information to link the institution to its associated sub-field.

A location specific institutional client 203 may include a specific institution at a specific location. For example, the location specific institution may include a supermarket at the corner of $12^{th}$ and $9^{th}$ streets. In another embodiment, the location specific institution may be a specific academic institution such as a specific college or university.

The varied location institutional client 203 may include institutions having a plurality of locations. In one embodiment, the varied locations institution may include a merchant with a plurality of locations.

At least one of the sub-fields 14a-14n may be assigned a specific category. In one embodiment, the sub-fields 14a-14n may be variable so that the category may be changed. Thus, for a period of time, an account issuer 201 (shown in FIG. 2) may designate sub-field 14a to include all grocery stores in a certain area. At a different period of time, the account issuer 201 may change the designation of category 14a to be all gas stations in a certain area.

The benefits provided in sub-fields 14a-14n may be downloaded into the stored value account 10 through a stored value network by the issuer of the card, as described below with reference to FIG. 2. Additionally, either the consumer client 205 or the institutional client 203 may be eligible to load value into the stored value account 10. Typically consumer clients 205 will load value. However, institutional clients 203 may load incentive values so that consumer clients 205 may automatically receive a discount when patronizing that institutional client 203. Institutional clients 203 may also load rebates into the stored value account 10. Furthermore, the institutional clients 203 may initially establish the stored value account 10 for subsequent use by the consumer clients 205.

When using the stored value account 10, if a consumer selects an establishment corresponding to one of the sub-fields 14a . . . 14n, the funds are withdrawn from that sub-field. If the selected sub-field 14 has insufficient funds, an embodiment of the stored value account 10 may access the general purse 12 for withdrawal of funds.

The benefits in sub-fields 14a-14n may include a discount in a certain category, loyalty points for a certain category, a rebate directed to a certain category, financial aid reimbursement in the academic institution category, or other special promotions in a certain category. The category specific benefits held in sub-fields 14a-14n may be negotiated by the issuer of the stored value account 10.

The discounts may include seasonal discounts to provide promotional savings. As an illustration, the promotional savings may include a special discount over sale rates for certain travelers traveling on a certain airline for during a predetermined time period. For example, transportation companies may offer a five percent discount to students traveling over spring break. This type of benefit allows stored value account holders to automatically receive a benefit for using the stored value account 10 without the need for a paper certificate. The benefit also allows institutional clients 203 to receive a benefit of a larger number of customers, by providing the discount, without having to market the discount.

In one embodiment, the benefits stored in sub-fields 14a-14n may include loyalty points. In this embodiment, a user may earn points towards gifts or prizes or products sold by the merchants by buying products or services from the merchant.

In one embodiment, a category specific stored value may be stored in sub-fields 14a-14n. For example, a stored value may be stored in a grocery store sub-field. Thus, the category specific stored value stored, for example, in sub-field 14a, may be used only at the category represented by sub-field 14a. Thus, if the category of sub-field 14a includes all the grocery stores in a certain area, defined geographically, the value stored in sub-field 14a may be spent only in the grocery stores in the defined area. In the example of a "campus card," the grocery store category may include all grocery stores within a five mile radius of the campus. Continuing with the example of the campus card, the category specific stored benefits may include tuition for a specific educational institution or a group of educational institutions, restaurants in a campus area, campus sporting events, etc.

In another embodiment, the category specific stored value may be directed to location specific institutions, such as, for example, a specific drug store near a campus, the campus bookstore, a specific grocery store near a campus, a specific restaurant or dining establishment near a campus or on campus, etc.

The category specific benefits may also include other promotions. Other promotions may include item give-aways for a minimum purchase, promotions based on a user profile, promotions based on past user purchases, etc. For example, if an institutional client 203 has a large inventory of a specific item that needs to be sold, the institutional client 203 can negotiate with the issuer 201 of the stored value account 10 to offer discounts for the product to a predetermined subset of all of the users of the card. Additionally, the consumer clients 205 who receive the special may be consumer clients 205 who have bought that item before or consumer clients 205 having some indication in their profile that they would buy products or services from the institutional client 203. In another embodiment, the institutional client 203 may offer the overstock items to all consumer clients 205.

FIG. 2 is a block diagram illustrating one embodiment of a system 200 implementing the present invention. System 200 may include an issuer 201, an account 10, clients 203, 205 and an account access mechanism 212. Issuer 201 is coupled to a database 202 and may include a server 208. Clients 203 and 205 may be coupled by a communications link 215 to a network service provider 204.

The consumer client 205 may be provided with the access mechanism 212 for accessing the stored value account 10. The institutional client 203 may include an access reader 211 for recognizing the access mechanism 212. Additionally, the issuer 201 may provide its own access readers 222 for recognizing the access mechanism 212.

The account access interface 250 as shown in FIG. 1, may be formed by a combination of components including the communication links 215, 220, the access mechanism 212, and the access readers 211, 222. Other components may also form the account access interface 250. Whenever any client accesses the stored value account 10 for loading or redemption, the client obtains access through the account access interface 250.

In one embodiment, issuer 201 may be linked to clients 203 and 205 via communications link 215. In other embodiments, there may be multiple servers 208 or more than two clients, 203, 205. In some embodiments, clients 203, 205 may be configured to perform all processing and storage functions which might otherwise be performed by the server 208 and the database 202, respectively.

In one embodiment, stored value account 10 may be implemented using a stored value card as the access mechanism 212, such as, for example a prepaid card. Stored value account 10 may be accessed through the use of a stored value card having a magnetic stripe or through the use of a virtual account number. In one embodiment, the stored value card 212 may be read by any access reader 211, 222. Access readers 211, 222 may be compatible with the Visa™ network or the MasterCard™ network and may not require entry of a personal identification number (PIN). Alternatively, the card 212 may be a private label card, which offers restricted use for a virtual or actual mall environment while operating out of a BIN (such as VISA/Mastercard). As another alternative, a closed loop card may be provided for use only within participating merchant establishments operating with a special network infrastructure. Additionally, the card 212 may be usable with a PIN through ATM or POS over networks such as Plus, Cirrus, and/or Interlink/Star network. In yet an additional alternative embodiment, only a virtual card is provided in the form of an index for accessing the account 10.

Issuer 201 may host applications facilitating financial transactions for banks, merchants or other entities. Such applications may be related to the transfer between accounts such as at account 10 for the conversion of currency or to the performance of other functions which may or may not be described herein. The server 208 of the issuer 201 may be or include, for instance, a workstation running the Microsoft Windows™ NT™, Windows™ 2000, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

Additionally, server 208 may interface to database 202. Database 202 may contain the stored value accounts 10, financial account data, currency conversion rates, merchant information, user information, promotion information or other information as appropriate to the operation of the stored value system of the present invention. Database 202 may be, include or interface to, for example, the Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a storage area network (SAN), Microsoft Access™ or others may also be used, incorporated or accessed in the invention.

Various configurations may be provided for loading and redeeming value from the stored value accounts 10. Three entities including the issuer 201, the institutional client 203, and the consumer client 205 may have access to the stored value account 10. Whereas the consumer client 205 may have virtually unlimited access to the stored value account 10, the issuer 201 and the institutional client 203 may have limited access. For instance, the institutional client 203 may be able to freely load value to the account 10, but may redeem value only at the direction of the consumer client 205 (such as when the consumer client 205 makes a purchase). The issuer 201 will typically provide account services as directed by the consumer client 205.

Institutional clients 203 may include an access reader 211 that is a customer terminal where the stored value in the account 10 is to be redeemed for cash or for purchase of goods or services. The issuer 201 may also provide an access mechanism 222 in the form or a customer terminal for redemption of cash. The customer terminals may be fixed or portable terminals owned or used by users of the system and method. The consumer client 205 may implement the access mechanism 212 to request these services from the access readers 211, 222. Additionally, services independent of the institutional client 203 and issuer 201 may also provide a compatible access reader. For instance, convenience stores may position such access readers inside the stores, in a manner similar to that currently used for ATM machines.

Furthermore, readers 211, 222 may be or include, for instance, an ATM (automated teller machine). Clients 203, 205 may also be or include a PC (personal computer) running the Microsoft Windows™ 95, 98, Millenium™, NT™, or 2000, WindoWS™CE™, PalmOS™, Unix, Linux, Solaris™, OS/2™, BeOS™, MacOS™ or other operating system or platform. Clients 203, 205 may include a microprocessor such as an Intel x86-based device, a Motorola 68K or PowerPC™ device, a MIPS, Hewlett-Packard Precision™, or Digital Equipment Corp. Alpha™ RISC processor, an Intel Pentium®, Pentium® II, or Pentium® III processor, a microcontroller or other general or special purpose device operating under programmed control. Access readers 211, 222 may furthermore include electronic memory such as RAM (random access memory) or EPROM (electronically programmable read only memory), storage such as a hard drive, CDROM or rewritable CDROM or other magnetic, optical or other media, and other associated components connected over an electronic bus, as will be appreciated by persons skilled in the art. Access readers 211, 222 may also be or include a network-enabled appliance such as a WebTV™ unit, radio-enabled Palm™ Pilot or similar unit, a set-top box, a networkable game-playing console such as Sony Playstation™ or Sega Drearncast™, a browser-equipped cellular telephone, or other TCP/IP client or other device. Access readers 211, 222 may also be, include or interface to a wired digital or analog telephone, or a wireless digital or analog telephone such as a cellular telephone or a satellite telephone.

In an embodiment of the invention in which the stored value account 10 is accessed through the use of a card, clients 203, 205 may also be, include or interface to the access reader 211, 222. Readers 211, 222 may be adapted to communicate over the links 215, 220 with the consumer client 205 having the account access mechanism 212. Together, access readers 211, 222 and links 215, 220 may effectuate the transfer of value from a terminal to the stored value account 10. In one embodiment, reader 211 and link 220 may facilitate that exchange of value in the stored value account 10 for goods, services, or cash. Although only one client 203 and one client 205 are shown, the system 200 may include as many clients 203, 205 as needed or desired.

There may be different embodiments of account access mechanism 212. In one respect, if the access mechanism 212 is a stored value card, different versions of the stored value card may differ as to materials used in fabrication. Both disposable and reloadable stored value cards may be made of paper, plastic, or any other suitable material. The stored value card 212 may contain at least one feature for storing data. In one embodiment, data may be stored on a magnetic stripe. Other embodiments may include electronic magnetic, or optical structure in the interior of the card. Data stored on the stored value card may include, for example, a name, an account number, numerical representation of value, an indication of categories stored in sub-fields 14a-14n, personal identification number, or other data utilized by the method or methods disclosed herein. In one embodiment, stored value card 212 may include a processor. The stored value card 212 may contain enough information merely to index the stored value account 10. Alternatively, the stored value card 212 may store additional account information relating to available funds in the purse area 12 and sub-fields 14.

The stored value card 212 may be physically or electronically configured in a way that is compatible with recognized industry standards, such as proton, mondex, common electronic purse specification ("CEPS"), or other standards familiar to those in the art of electronic accounts. The system is preferably capable of online real-time and extensible markup language (XML) transactions. In any case, stored value the card 212 should comprise a computer readable medium.

The term "computer-readable medium" as used herein refers to any medium that participates in providing instructions to the processor for execution. Such a medium may take many forms, including but not limited to non-volatile media, volatile media, and transmission media. Non-volatile media include dynamic memory, such as main memory. Transmission media include coaxial cables, copper wire and fiber optics, including the wires that comprise the bus. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

In an alternative embodiment, the user may be provided only with an account access mechanism 212 that includes only an index to the stored value account 10. In this embodiment, the consumer client 205 possesses an account number or any alphanumeric which is linked to the account number in the database 202. In this embodiment, the access readers 211, 222 would not be required to read a card, but may instead include a keypad or other interface. The access mechanism could also include the consumer client's voice and the access reader 211, 222 would then include voice recognition apparatus. The access mechanism could also include an image, a thumbprint, or any other suitable identifying indices. The readers 211, 222 would then be provided with equipment for recognizing these unique indices.

Server 208, database 202 and clients 203, 205 may communicate with each other via communications links 215, 220. Communications links 215, 220 may be, include or interface to any one or more of, for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Communications links 215, 220 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth, BlueTeeth or WhiteTooth radio link, or an IEEE 802.11-based radio frequency link. Communications link 215, 220 may yet further be, include or interface to any one or more of an RS-232 serial connection, an IEEE-1394 (Firewire) connection, a Fibre Channel connection, an IrDA (infrared) port, a SCSI (Small Computer Systems Interface) connection, a USB (Universal Serial Bus) connection or other wired or wireless, digital or analog interface or connection. Communications links 215, 220 may further be, include, or interface to a PSTN (public-switched telephone network).

In some embodiments, the type of communication between system components represented by communication links 215, 220 may not be implemented in the same way. Moreover, in some embodiments, it may not be necessary that all components communicate with each other.

Server 208 and clients 203, 205 may utilize network enabled code in order to facilitate functionality in a network-based environment. Network enabled code preferably accepts XML packets in real time, but may also be, include or interface to, for example, Hyper text Markup Language (HTML), Dynamic HTML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™, Common Gateway Interface (CGI), Draft Five, Automated Clearinghouse (ACH), or other compilers, assemblers, interpreters or other computer languages or platforms.

Figure 3:
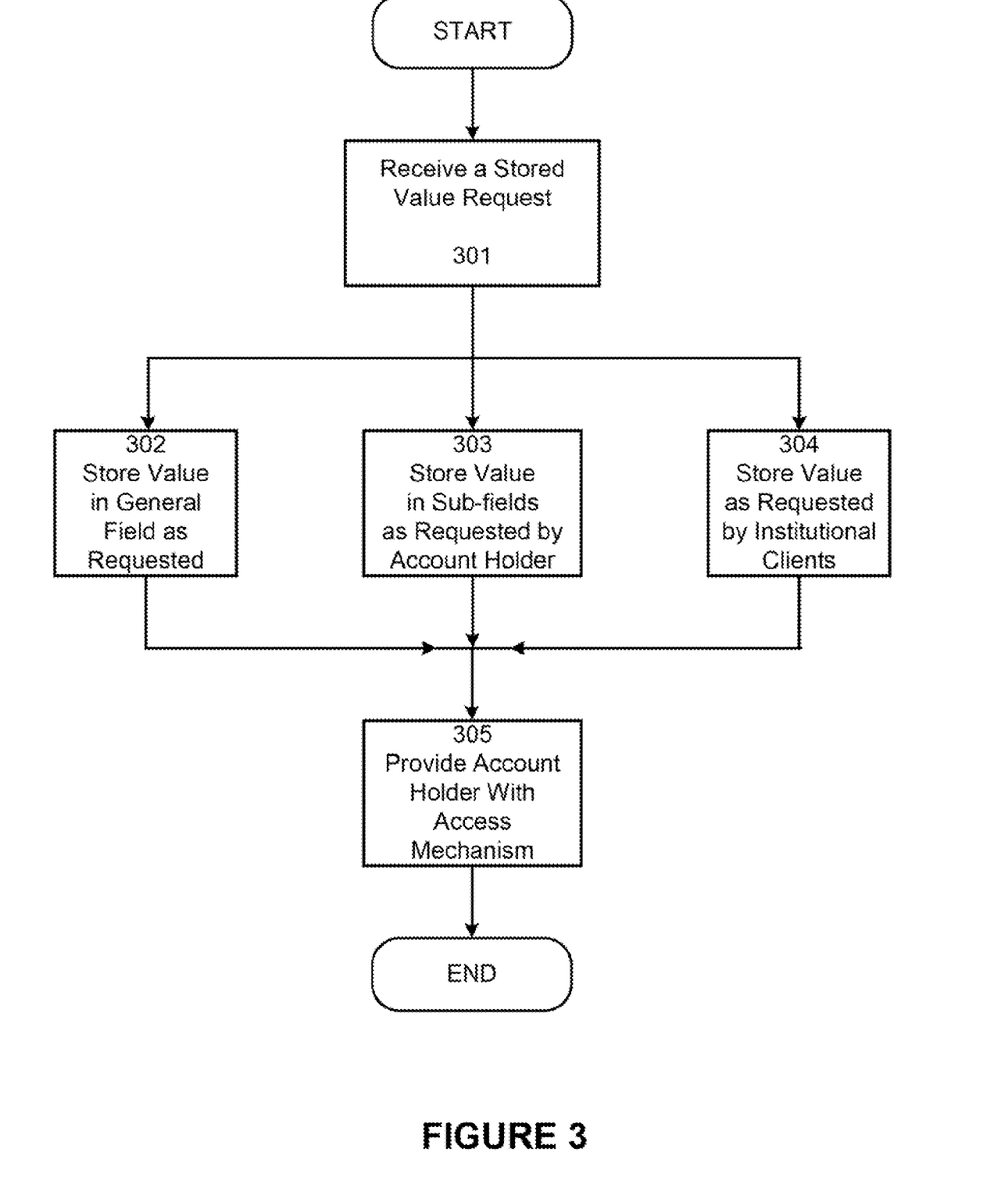
FIG. 3 is a flow diagram illustrating one embodiment of a method for creating a stored value account according to the present invention.

FIG. 3 is a flow diagram illustrating one embodiment for configuring a stored value account 10. At step 301, issuer 201 may receive a stored value account request. At step 302, the issuer may store a general value in the general field 12 of stored value account 10. At step 303, the issuer 201 may store a category specific stored value in a sub-field 14a-14n if the user requests a category specific stored value. At step 304, issuer 201 may remotely store a category specific benefit in sub-field 14a-14n.

The processes illustrated in FIG. 3 may be performed by a stored value system according to the present invention, such as the system illustrated in FIGS. 1 and 2. Additionally, the sequence of steps shown in FIG. 3 may be modified in accordance with the present invention. The steps illustrated in FIG. 3 will now be described in greater detail.

FIG. 3 illustrates an embodiment of the formation of the stored value account 10 through communication with the issuer 201. In step 301, an issuer 201 may receive a stored value request from a consumer client 205. The consumer client 205 preferably transmits the request to the issuer 201 of the stored value accounts 10. Initial communication between the consumer client 205 and the issuer 201 may occur in person, over a web site, over the telephone, or over any other type of network. The request for a stored value account must be accompanied by or followed by the finds requested to be stored. The consumer client 205 may use any known technique for submitting the requested value to the issuer 201. These techniques include but should not be limited to credit card payment, payment by check, payment by cash, or transfer of funds from another account. Alternatively in step 301, the institutional client 203 may request formation of the stored value account 10.

Steps 302, 303, and 304 are the value loading steps. These steps may occur in any order upon the establishment of the stored value account 10. In step 302 the issuer 201 may store a general value in the general field 12 as requested by the consumer client 205. In one embodiment, the consumer client 205 may request the issuer 201 to place a specific value in the general field 12 of account 10. In another embodiment, the consumer client 205 may choose from a plurality of possible values presented to the user by the issuer 201. In one embodiment, the consumer client 205 may choose not to place any value in the general field 12 of stored value account 10.

In step 303, the issuer 201 stores value in the sub-fields as requested by the consumer client 205. If the benefit to be stored in a sub-field 14a-14n includes a specific stored value for a specific institution, the issuer may store the amount of value directed toward the institution in one of the sub-fields 14a-14n. For example, the user may request that an amount of 200 dollars be stored in a grocery store sub-field 14a-14n when the user transmits a request for a stored value card 213 to the issuer 201. In other embodiments, the user may not have the option of storing a value in a category specific sub-field 14a-14n. Each sub-field 14a-14n may include an expiration period, such that if the consumer client 205 doesn't use the value provided by an institutional client 203 in a specific sub-field, the value may become unavailable as of a specified date.

In one embodiment, the issuer 201 may present the user with a plurality of choices for categories in which the user may store a value. The issuer 201 may then store the amount requested in the predetermined category specific sub-field 14a-14n. For example, the issuer 201 may store the $200 the user has requested to be stored in a grocery store sub-field in the sub-field 14a-14n designated to be the grocery store sub-field.

Thus, the consumer client 205 will ensure that at least a predetermined amount of stored value may be spent at a predetermined institution. For example, if the stored value account 10 is a campus account, a parent purchasing the stored value account 10 will be able to ensure that a college student will have enough money for groceries. For example, even if the student runs out of money in the general value field 12 of the stored value account 10, the student will still have the value stored in the grocery store sub-field. In one embodiment of the campus account, issuer 201 may negotiate a discount for some university events or all university events for a certain university. For example, users of the stored value account 10 may receive a 10% discount when attending a theatrical performance at a university.

Alternatively, the rules for the account 10 may be entirely established by the institutional clients 203. The institutional clients 203 may establish account parameters based on the behavior of consumer clients 205. The institutional clients 203 can provide initial funding for a sub-field 14a-14n or subsequently provide funding based on the behavior of the consumer clients In step 304, the issuer 201 stores any initial value provided by institutional clients 203. Institutional clients 203 may in some instances provide incentive funds to be deposited in a sub-field in order to establish a new account or upon the establishment of each new stored value account 10. For example, the stored value account 10 may include a permanent benefit stored in a sub-field 14a-14n, such as, a permanent 5% discount for a certain merchant or a discount at spring break for a flight on a specific airline, if the consumer client 205 uses the account 210 to purchase an airline ticket during a predetermined interval.

In one embodiment, the issuer may negotiate with institutions to provide the benefits to account users. The categories 14a-14n may be variable, such as the airline tickets for spring break example above. In another example, in one promotional period, sub-field 14b may be used to provide users of the stored value account 10 with a promotion from a retailer. In another promotional period, sub-field 14b may be used to provide users with travel promotions, such as a free gift from an airline, hotel, gas station, or another travel-related merchant.

In step 305, the issuer 201 provides the account holder or consumer client 205 with an access mechanism 212 in order to access the stored value account 10.

Thus, a stored value account 10 provides issuers 201, institutional clients 203 accepting the stored value account 10 and consumer clients 205 of the stored value account 10 with flexibility and added function. Consumer clients 205 may receive exclusive savings or promotions from institutions. Institutional clients 203 may be able to dispose of excess inventory and market merchandise at lower costs. Issuers 201 may gain increased utilization and usage of the stored value account 10.

Figure 4:
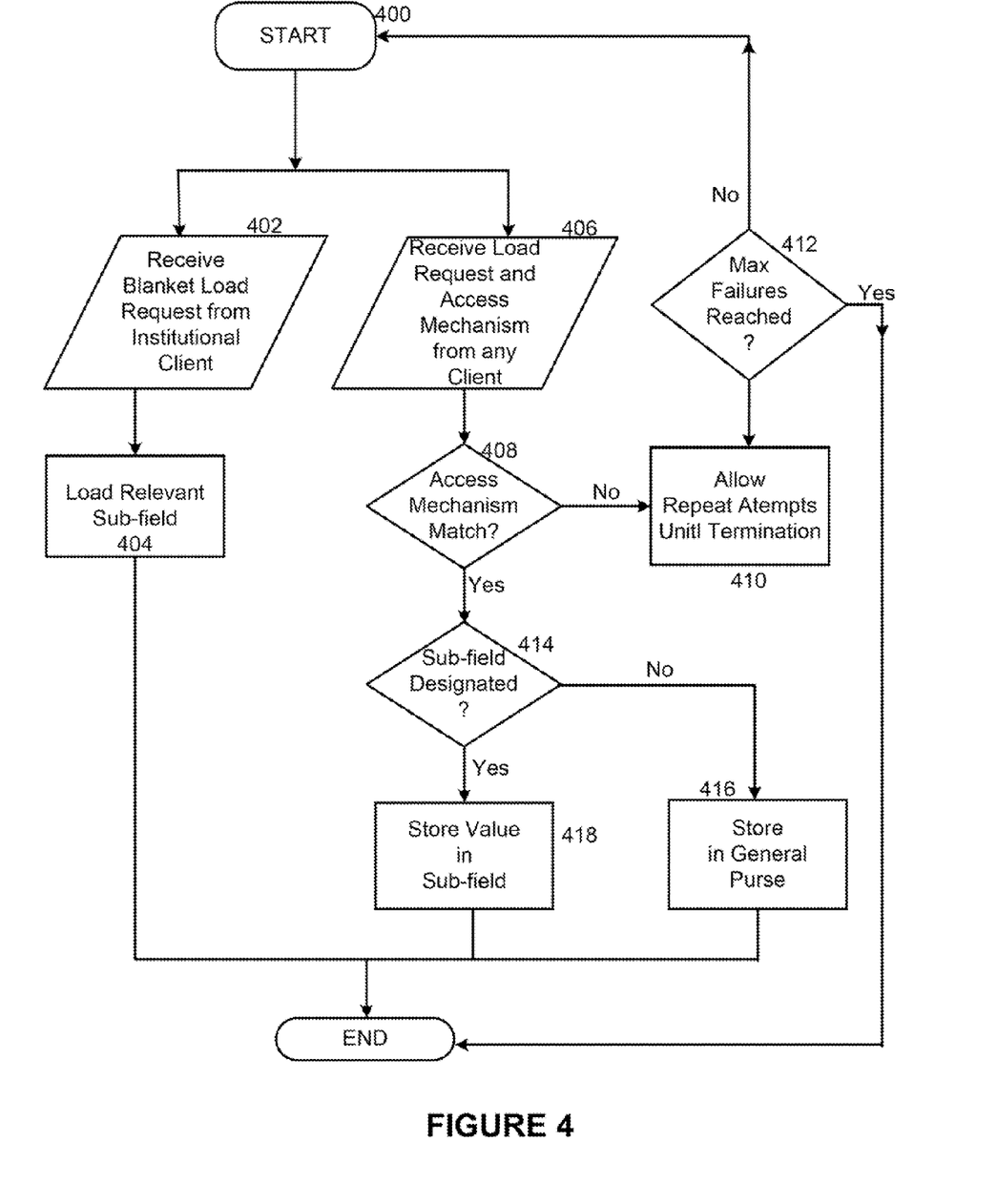
FIG. 4 is a flow diagram illustrating a method for loading value into an existing stored value account according to the present invention.

FIG. 4 illustrates an embodiment of a process 400 for loading value into an established stored value account 10. In step 402, the issuer 201 may receive a blanket load request from an institutional client 203. In other words, the institutional client 203 provides an incentive to all consumer clients 205. In this instance, the issuer 201 will load the relevant sub-field 14 in step 404.

In step 406, the issuer 201 may receive a load request accompanied by an access mechanism from either a consumer client 205 or an institutional client 203. The consumer client 205 may wish to load additional value to the account 10. Alternatively, an institutional client 203 may be processing a purchase from the consumer client 205 and decide to provide the consumer client 205 with a present or future discount. Under either of these circumstances, the appropriate client provides the issuer with an access mechanism 212 in step 406 and the issuer 201 determines whether the access mechanism correctly matches the stored value account in step 408. If there is no match, the issuer allows repeat attempts in step 410 until the maximum number of failures has been reached in step 412.

If the issuer 201 finds that the access mechanism is correct in step 408, the issuer determines whether the consumer client 205 or institutional client 203 has designated a sub-field in step 414. If no sub-field is designated, the issuer 201 stores the value in the general purse in step 416. If a sub-field is designated, the issuer 201 stores the value in the sub-field in step 418.

As set forth above with reference to FIG. 3, the request to load value may be accompanied by or followed by the necessary funds to carry out the request. These funds may be provided in any known manner.

Figure 5:
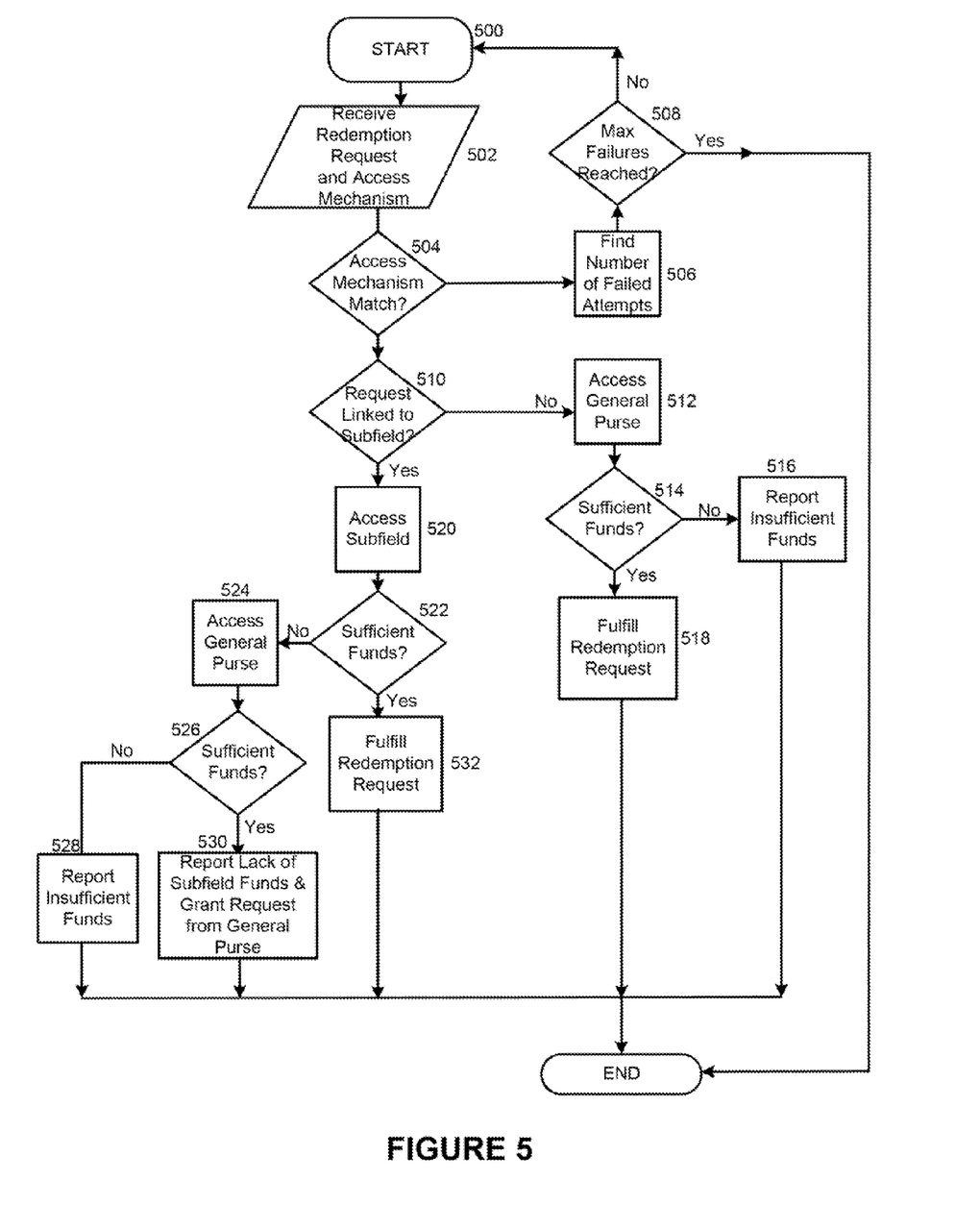
FIG. 5 is a flow diagram illustrating a method for redeeming value from an existing stored value account.

FIG. 5 illustrates a process 500 for redemption of value in accordance with an embodiment of the invention. In step 502, the issuer 201 receives a redemption request and an access mechanism 212. In step 504, the issuer 201 attempts verification of the access mechanism 212. If the issuer 201 cannot verify the access mechanism 212, the issuer finds the number of failed attempts in step 506 and determines if the maximum number of allowable failures has been reached in step 508. The allowable number of failures may be set by the issuer. If the number of failures has been reached, the issuer 201 terminates the process. If the maximum number of failures has not be reached in step 508, the issuer 201 may allow the attempt to repeat.

If the issuer 201 verifies the access mechanism 212 in step 504, the issuer 201 determines in step 510, whether the request is linked to a particular sub-field 14. If the request is not linked to a sub-field 14 in step 510, the user 201 accesses the general purse 12 in step 512. In step 514, the issuer 201 determines whether the general purse 12 contains sufficient funds. If the general purse 12 does not contain sufficient funds, the issuer 201 reports the insufficient funds in step 516. If the general purse 12 does contain sufficient funds, the issuer 201 fulfills the redemption request in step 518.

If the request is linked to a sub-field in step 510, the issuer 201 accesses the sub-field 14 in step 520. In step 522, the issuer 201 determines if the sub-field has sufficient funds. If the sub-field has sufficient funds in step 522, the issuer 201 fulfills the redemption request in step 532. If the sub-field 14 does not have sufficient funds in step 522, the issuer 201 accesses the general purse 12 in step 524. If the issuer 201 finds sufficient funds in the general purse 12 in step 526, the issuer 201 may report lack of sufficient sub-field funds, but nevertheless fulfill the redemption request through the use of funds in the general purse 12 in step 530. This particular feature may or may not be present in other embodiments of the method of the invention.

If the issuer 201 does not find sufficient funds in step 526, the issuer 201 may report insufficient funds in step 528 and terminate the process. In an alternative embodiment, the issuer 201 may inform the consumer client 205 that insufficient funds are available and then provide the consumer client 205 with an opportunity to supplement the available funds. The consumer client 205 may use a credit card, account transfer, or other funding source to add value to the account 10 in order to complete the purchase. The added value preferably supplements existing funds so that the account 10 has exactly enough value to complete the purchase.

The stored value system preferably includes a mechanism for sending a statement to the consumer client 205 on a periodic basis. The statement identifies the source of funds available in the stored value account. Accordingly, through viewing the statement, the consumer client 205 will be able to determine that a specific institutional client 203 has added value to the general field 12 or to one of the sub-fields 14*a*-14*n*.

In summary, the invention provides a stored value system valuable to both consumers and institutions. Both entities receive considerable benefits from using the stored value system.

While the foregoing description includes many details and specificities, it is to be understood that these have been included for purposes of explanation only, and are not to be interpreted as limitations of the present invention. Modifications to the embodiments described above can be made without departing from the spirit and scope of the invention, as is intended to be encompassed by the following claims and their legal equivalents.

What is claimed is:

1. A stored value system, comprising:
   a stored value account on a computer readable medium, the stored value account comprising a general stored value account and at least one stored value subaccount, the stored value subaccount representing a category and storing category specific stored value;
   the general stored value account containing stored value, comprising funds, accessible by the stored value accountholder for redemption wherever the stored value account is accepted for redemption;
   the stored value subaccount having stored value, comprising funds, being accessible for the stored value accountholder for redemption when a stored value transaction corresponds to the category of the subaccount;
   the stored value account on the computer readable medium providing for the stored value accountholder to access funds associated with multiple stored value accounts comprising at least the general stored value account and the stored value subaccount;
   the stored value account permitting an individual bearing a stored value account access mechanism to access each of the general stored value account and the category-specific stored value subaccount, and both the general stored value account and the stored value subaccount being associated with the same issuer;
   an account access interface; and
   an access mechanism for allowing access to the stored value account through the use of the account access interface.

2. The stored value system of claim 1, wherein the account access interface and the access mechanism comprise means for allowing a consumer client and an institutional client to access the stored value account in order to load value in the stored value account.

3. The stored value system of claim 2, further comprising a communication link between the consumer client and the institutional client enabling the consumer client to provide the institutional client with the access mechanism in order to obtain access to the stored value account through the account access interface.

4. The stored value system of claim 2, wherein the institutional client comprises one of an educational institution, a merchant, and a service provider.

5. The stored value system of claim 2, wherein the institutional client comprises one of a group of institutions, a location specific institution, and a varied location institution.

6. The stored value system of claim 1, wherein the access mechanism comprises a card having a magnetic stripe.

7. The stored value system of claim 1, wherein the access mechanism comprises an alphanumeric index for accessing the stored value account.

8. The stored value system of claim 1, wherein the category is a variable category changeable by an issuer of the account.

9. The stored value system of claim 1, wherein the access mechanism comprises a stored value card usable on a credit card network.

10. A system for processing stored value account transactions, comprising:
    a computer readable medium comprising a general stored value account and at least one stored value subaccount, the computer readable medium corresponding to a stored value account for a specific stored value accountholder;
    the general stored value account containing stored value, comprising funds, that is accessible by the stored value accountholder for redemption wherever the stored value account is accepted for redemption; and
    the stored value subaccount representing a category and including category-specific stored value, comprising funds, stored in the subaccount of the stored-value account, the stored value subaccount being accessible for the stored value accountholder for redemption when a stored value transaction corresponds to the category of the subaccount;
    the stored value account on the computer readable medium providing for the stored value accountholder to access funds associated with multiple stored value accounts comprising at least the general stored value account and the stored value subaccount;
    the stored value account permitting an individual bearing a stored value account access mechanism to access each of the general stored value account and the category-specific stored value subaccount, and both the general stored value account and the stored value subaccount being associated with the same issuer; and
    a processor for processing redemption transactions from the general account or the subaccount based on data stored on the computer readable medium for the general account or subaccount, the processor processing the redemption transactions to redeem funds from the general account or the subaccount.

11. The stored value account of claim 10, wherein the stored value account is accessible through a stored value card usable on a credit card network.

12. The stored value account of claim 11, wherein the stored value card comprises a card having a magnetic stripe usable in a card reader.

13. The stored value account of claim 10, wherein the category comprises at least one institution.

14. The stored value account of claim 13, wherein the institution comprises one of a group of institutions, a location specific institution and a varied location institution.

15. The stored value account of claim 13, wherein the institution comprises one of an educational institution, a merchant and a service provider.

16. The stored value account of claim 10, wherein the category specific stored value is accessible for redemption when the stored value transaction corresponds to the category of the subaccount.

17. A computer-implemented method for enabling a cashless transaction, comprising the steps of:
receiving a stored value request;
using a computer to establish on a computer readable medium a stored value account including both a general stored value account and at least one category specific stored value subaccount; and
storing on said computer readable medium at least one of (a) a general stored value, comprising funds, based on the stored value request, in the general stored value account of the stored value account and (b) a category specific stored value, comprising funds, corresponding to an institution associated with the category, in the stored value subaccount of the stored value account,
the general stored value account containing stored value, comprising funds, that is accessible by the stored value accountholder for redemption wherever the stored value account is accepted for redemption, and the category specific value being accessible for redemption when a stored value transaction corresponds to the category of the subaccount;
the stored value account on the computer readable medium providing for the stored value accountholder to access funds associated with multiple stored value accounts comprising at least the general stored value account and the stored value subaccount;
the stored value account permitting an individual bearing a stored value account access mechanism to access each of the general stored value account and the category-specific stored value subaccount, and both the general stored value account and the stored value subaccount being associated with the same issuer;
the computer readable medium corresponding to a stored value account for a specific stored value accountholder; and
the computer readable medium being readable by a computer upon the accountholder attempting a stored value transaction in order to process redemption against at least one of the general stored value account and the stored value subaccount.

18. The method of claim 17, wherein the step of storing a category specific stored value comprises identifying the category and storing a category specific stored value for the category specific subaccount associated with that category.

19. The method of claim 17, further comprising the step of receiving a request from an institution to store a category specific stored value in the subaccount and storing the stored value based on the request.

20. A system for enabling a cashless transaction, comprising:
means for receiving a stored value request for placing stored value in a stored value account on a computer readable medium;
means for storing a general value based on the stored value request in a general stored value account of a stored value account, the general stored value account containing stored value, comprising funds, that is accessible by the stored value accountholder for redemption wherever the stored value account is accepted for redemption; and
means for storing a category specific stored value, comprising funds, corresponding to an institution in a stored value subaccount of the stored value account, the stored value subaccount being accessible for the stored value accountholder for redemption when a stored value transaction corresponds to the category of the subaccount, including:
means for storing a category specific stored value corresponding to the institution based on the stored value request when a category specific stored value is requested; and
the stored value account on the computer readable medium providing for the stored value accountholder to access funds associated with multiple stored value accounts comprising at least the general stored value account and the stored value subaccount; and
the stored value account permitting an individual bearing a stored value account access mechanism to access each of the general stored value account and the category-specific stored value subaccount, and both the general stored value account and the stored value subaccount being associated with the same issuer.

21. A computer readable medium, the computer readable medium storing computer readable code executable to perform a process for enabling a cashless transaction, wherein the process of enabling the cashless transaction comprises the steps of:
receiving a stored value request;
storing under the control of a computer executing said code a general value in a computer database based on the stored value request in a general stored value account of a stored value account, the general stored value account containing stored value, comprising funds, that is accessible by the stored value accountholder for redemption wherever the stored value account is accepted for redemption; and
storing under the control of a computer executing said code a category specific stored value, comprising funds, in the computer database corresponding to an institution in a stored value subaccount of the stored value account, the stored value subaccount being accessible for the stored value accountholder for redemption when a stored value transaction corresponds to the category of the subaccount, including:
storing a category specific stored value corresponding to the institution based on the stored value request when a category specific stored value is requested; and
the stored value account providing for the stored value accountholder to access funds associated with multiple stored value accounts comprising at least the general stored value account and the stored value subaccount; and
the stored value account permitting an individual bearing a stored value account access mechanism to access each of the general stored value account and the category-specific stored value subaccount, and both the general stored value account and the stored value subaccount being associated with the same issuer.

22. A stored value system comprising:
a stored value account on a computer readable medium comprising a general stored value account and a stored value subaccount associated with a category;
the general stored value account containing stored value, comprising funds, that is accessible by the stored value accountholder for redemption wherever the stored value account is accepted for redemption;

the stored value subaccount having stored value, comprising funds, and being accessible for the stored value accountholder for redemption when a stored value transaction corresponds to the category of the subaccount;

an account access interface including means for permitting access by a consumer client, and means for permitting access by an institutional client wherein the institutional client corresponds to the category of the stored value subaccount and the institutional client can access the subaccount to load the subaccount with category-specific stored value;

the stored value account permitting an individual bearing a stored value account access mechanism to access each of the general stored value account and the category-specific stored value subaccount, and both the general stored value account and the stored value subaccount being associated with the same issuer; and the access mechanism for allowing access to the stored value account through the account access interface.

23. The stored value system of claim 22, further comprising a communication link between the consumer client and the institutional client enabling the consumer client to provide the institutional client with the access mechanism in order to obtain access to the stored value account through the account access interface.

24. The stored value system of claim 22, further comprising means for providing a statement to the consumer client, wherein the statement indicates a source of funds available in the stored value account.

* * * * *